United States Patent
Horr et al.

(10) Patent No.: US 9,037,673 B2
(45) Date of Patent: May 19, 2015

(54) METHOD FOR DOWNLOADING A CONFIGURATION FILE IN A PROGRAMMABLE CIRCUIT, AND APPARATUS COMPRISING SAID COMPONENT

(75) Inventors: Olivier Horr, Rennes (FR); Patrick Will, Acigne (FR); Philippe Launay, Rennes (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 1117 days.

(21) Appl. No.: 12/086,820

(22) PCT Filed: Dec. 15, 2006

(86) PCT No.: PCT/EP2006/069749
§ 371 (c)(1),
(2), (4) Date: Jan. 15, 2009

(87) PCT Pub. No.: WO2007/071617
PCT Pub. Date: Jun. 28, 2007

(65) Prior Publication Data
US 2010/0064024 A1    Mar. 11, 2010

(30) Foreign Application Priority Data
Dec. 20, 2005   (FR) ..................................... 05 53965

(51) Int. Cl.
*G06F 15/16* (2006.01)
*H04N 21/458* (2011.01)
(Continued)

(52) U.S. Cl.
CPC ....... *H04N 21/4586* (2013.01); *H04N 21/4424* (2013.01); *H04N 21/818* (2013.01)

(58) Field of Classification Search
USPC ............................................ 709/217; 326/38
See application file for complete search history.

(56) References Cited

U.S. PATENT DOCUMENTS

| 5,671,355 | A |   | 9/1997  | Collins |
|-----------|---|---|---------|---------|
| 5,995,744 | A | * | 11/1999 | Guccione ........................ 703/23 |
| 6,057,703 | A | * | 5/2000  | Mok et al. ........................ 326/38 |

(Continued)

FOREIGN PATENT DOCUMENTS

| CA | 2399384 | 8/2001 |
| EP | 1168883 | 1/2002 |

(Continued)

OTHER PUBLICATIONS

Copy of Search Report Dated Oct. 19, 2007.

*Primary Examiner* — Thomas Dailey
(74) *Attorney, Agent, or Firm* — Tutunjian & Bitetto, P.C.

(57) ABSTRACT

The present invention relates to a method for downloading a binary configuration file in a programmable circuit implemented in a device. The device comprises at least one central processing unit, a plurality of connectors, and a programmable circuit enabling all or a part of the signals received by said connectors to be processed and transmitted to at least one other circuit of the device. The device analyzes the signals present on the connectors in order to define what other devices are connected and whether the connections are operational. Then, a configuration file is selected from among a set of configuration files according to the operational connections and is downloaded from a memory of the device into the programmable circuit. The invention also relates to a device having a component programmed according to the method previously described.

15 Claims, 3 Drawing Sheets

Figure 1:
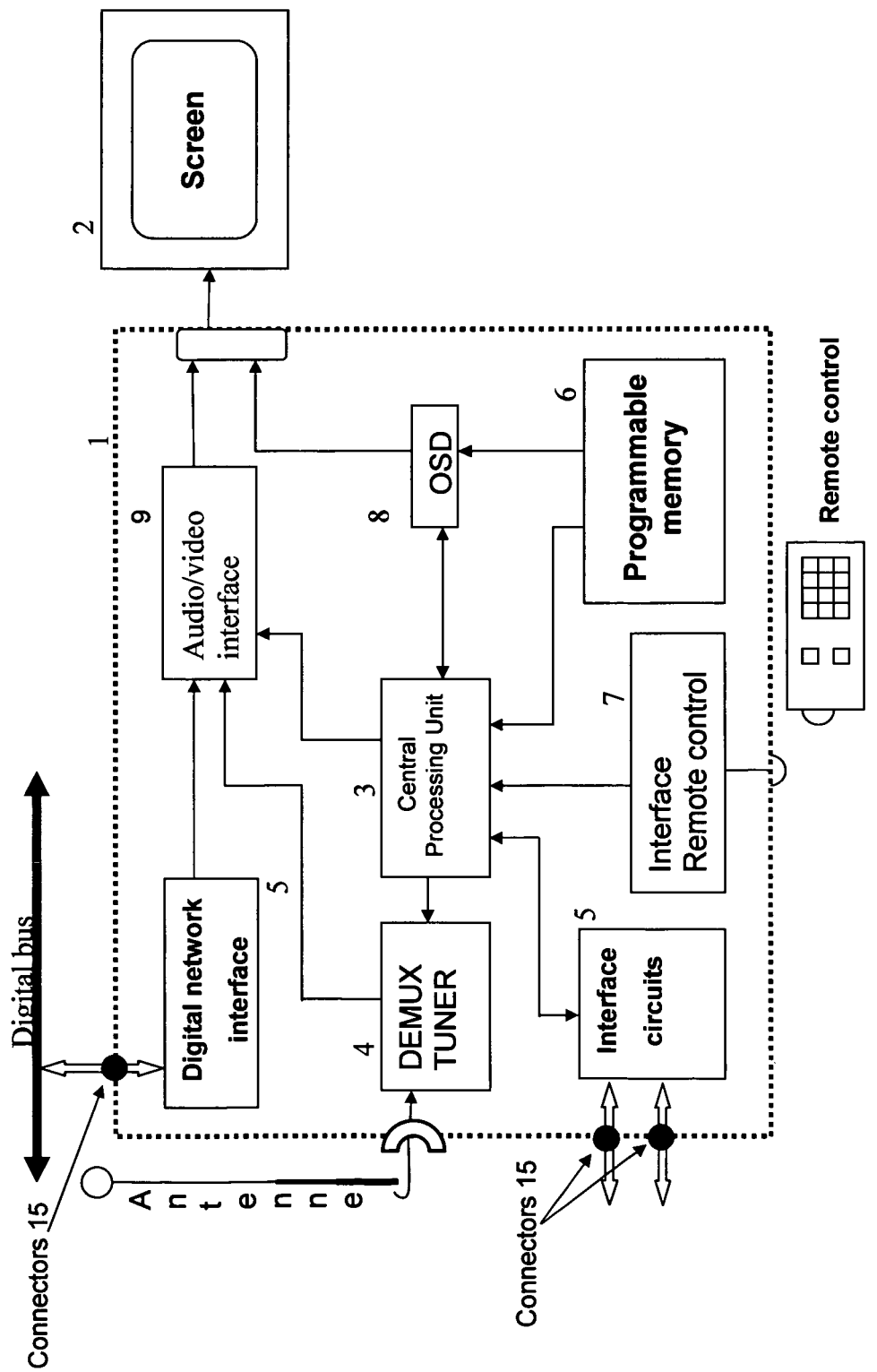

(51) Int. Cl.
*H04N 21/442* (2011.01)
*H04N 21/81* (2011.01)

(56) References Cited

U.S. PATENT DOCUMENTS

| | | | |
|---|---|---|---|
| 6,102,963 A * | 8/2000 | Agrawal | 716/117 |
| 6,144,933 A * | 11/2000 | Guccione | 703/23 |
| 6,260,139 B1 | 7/2001 | Alfke | |
| 6,289,440 B1 * | 9/2001 | Casselman | 712/227 |
| 6,308,230 B1 | 10/2001 | Potter et al. | |
| 6,326,806 B1 | 12/2001 | Fallside et al. | |
| 6,493,827 B1 * | 12/2002 | Mueller et al. | 713/300 |
| 6,538,468 B1 * | 3/2003 | Moore | 326/40 |
| 6,573,748 B1 * | 6/2003 | Trimberger | 326/38 |
| 7,019,558 B1 * | 3/2006 | Jacobson et al. | 326/38 |
| 7,043,630 B1 * | 5/2006 | Xia | 713/1 |
| 7,116,130 B2 * | 10/2006 | Liu et al. | 326/38 |
| 7,373,432 B2 * | 5/2008 | Rapp et al. | 710/8 |
| 2003/0107399 A1 | 6/2003 | Bailis et al. | |
| 2004/0093488 A1 * | 5/2004 | Horanzy | 713/1 |
| 2008/0095563 A1 | 4/2008 | Miyashita et al. | |

FOREIGN PATENT DOCUMENTS

| | | |
|---|---|---|
| GB | 2373595 | 9/2005 |
| JP | 07171095 | 7/1995 |
| JP | 7171095 | 7/1995 |
| JP | 09259068 | 10/1997 |
| JP | 9259068 | 10/1997 |
| JP | 10171744 | 6/1998 |
| JP | 2001290758 | 10/2001 |
| JP | 2004318371 | 11/2004 |
| JP | 2006181888 | 7/2006 |
| WO | WO9909498 | 2/1999 |
| WO | WO9934515 | 7/1999 |
| WO | WO0161525 | 8/2001 |
| WO | WO0162525 | 8/2001 |
| WO | WO2004049120 | 6/2004 |
| WO | WO2005050847 | 6/2005 |

* cited by examiner

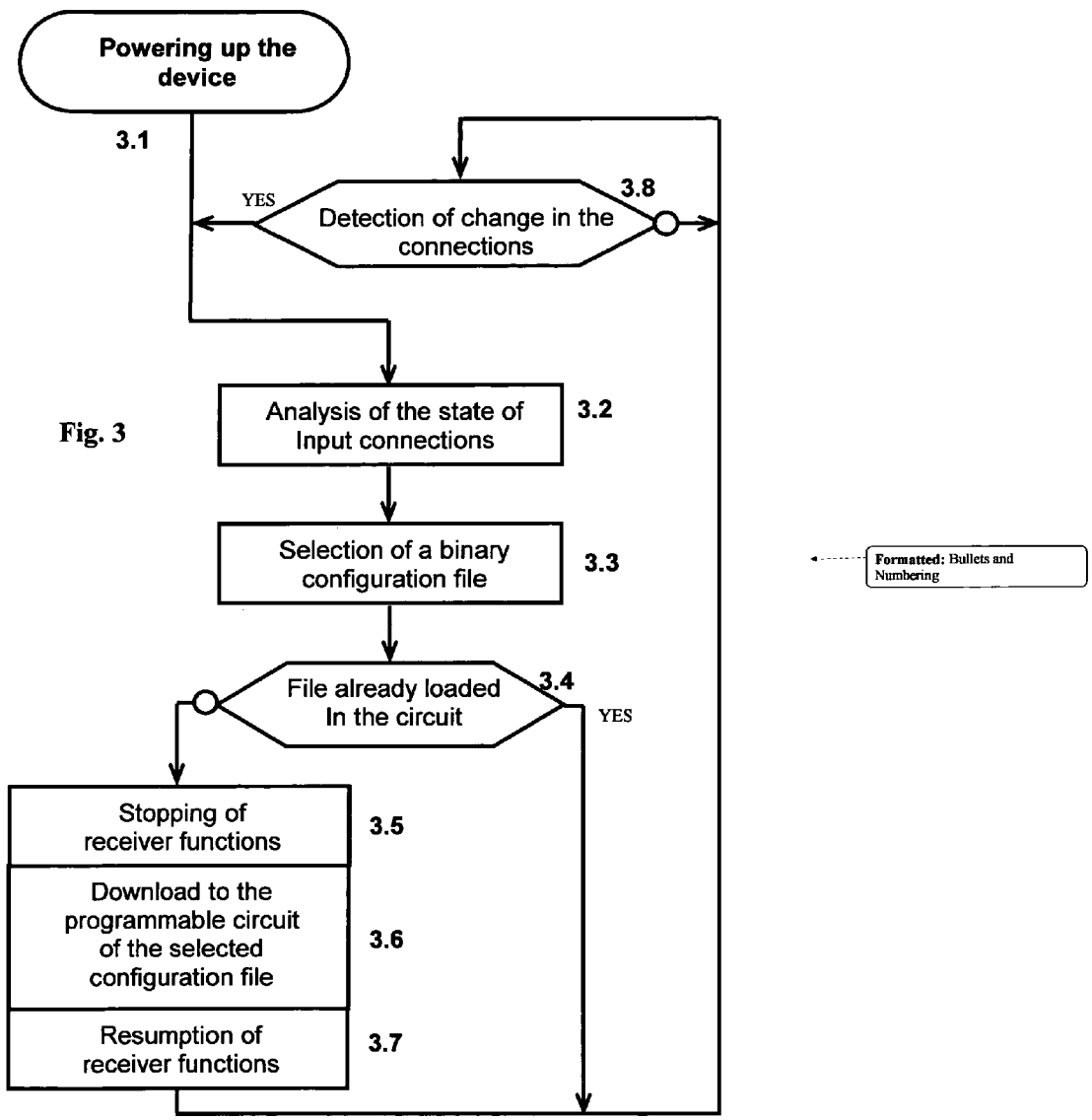

METHOD FOR DOWNLOADING A CONFIGURATION FILE IN A PROGRAMMABLE CIRCUIT, AND APPARATUS COMPRISING SAID COMPONENT

This application claims the benefit, under 35 U.S.C. §365 of International Application PCT/EP2006/069749, filed Dec. 15, 2006, which was published in accordance with PCT Article 21(2) on Jun. 28, 2007 in French and which claims the benefit of French patent application No. 05 53965, filed Dec. 20, 2005.

The invention relates to a method for downloading a configuration file in a programmable circuit and a device enabling such a download.

These days, there are numerous items of equipment available to the general public for processing, storing and reproducing a large number of audiovisual or audio contents. These devices contain the following electronic circuits: a central processing unit, generally a microprocessor, a memory containing a run program, a working memory, input/output peripherals (Tuner, communication circuit with a bi-directional network, an IR receiver, etc.) a mass memory (hard disk), etc. The central processing unit supervises the set of functions supplied by the device. It is therefore heavily used. To reduce the workload and hence improve performance for the completion of certain tasks, it is known that the capacity and performance of these peripheral circuits can be increased. Hence the communication circuits can manage the reception and transmission of a block of data, an OSD (On Screen Display) circuit enables insertion of a part of the picture on the screen, the hard disk has an interface ensuring the transfer of a large block of information.

These circuits are proposed by the manufacturers of integrated circuits and some models can be programmed by the central processing unit for the completion of specific tasks. However, some functions are very specific and cannot be performed (at least not efficiently) by circuits available on the market. In this case, and to further liberate the central processing unit to perform its functions, manufacturers have turned to programmable circuits. These circuits are identified as belonging to families commonly named with the acronyms: FPGA, EPLD, CPLD, depending on the technology used. These circuits contain a set of logical gates. Their programming consists in setting up electrical links between the gates in order to perform upgraded logical functions based on combinational or sequential circuit sets. Electrical links can be set up by destroying the fuse elements if the circuit is similar to a PROM. Other more recent technologies enable the integration into the circuits of EPROM cells that can be deleted by ultraviolet light, or EEPROM electrically writable and reprogrammable cells. In all cases, once programmed and installed on the target device, the circuit is operational and fulfils the functions for which it has been programmed.

For example, if the user wants to use a digital/analogue converter, then the input signal must be digitally coded, for example, according to the SDI (Serial Digital Interface) format. But if the user uses his device as an Audio Analogue/Digital converter he must apply the analogue signals for example, in CVBS format, at input.

The document U.S. Pat. No. 6,260,139 filed by Xilink describes a device having a programmable FPGA. The selection of code to introduce into the FPGA is performed by a selection means such as, switches, a mechanical multiplexer or a value introduced to an offset register. The codes to be downloaded for the programming of the FPGA are in a ROM 14. When a variation in the selection is signal is detected, the FPGA reads the code corresponding to the new combination of detected signals, in an external PROM. This document does not describe the FPGA function within the device.

The document U.S. Pat. No. 6,326,806 filed by Xilink describes a system to configure programmable circuits. A code to be downloaded by default in the FPGA is initially loaded during the powering up. Then, another code to load in the FPGA can be totally or partially transmitted by the network. The choice of code to download is made at the level of the network.

The present invention describes a methodology used for the dynamic programming of one or more programmable circuits.

The object of the present invention is a method to download a configuration file to a programmable circuit implemented in a device, said device comprising a plurality of connectors destined for the transmission of communication signals with at least one other device, and a programmable circuit enabling processing of said communication signals received from said connectors and transmission of them to at least one other circuit (3) of the device; characterized in that it comprises:

an analysis step of communication signals present on the connectors in order to detect operational connections enabling communication with at least one other device, a downloading step of at least one configuration file selected from among a set of configuration files according to the presence of the detected operational connections.

In this way, the programmable circuit is configured according to the operational connections with other devices.

According to a first improvement, the operational connections are those for which the connected device delivers a determined electrical level. Hence the device determines the connected devices supplying said voltage and liable to enter into communication.

According to another improvement, the analysis step intervenes continuously while the device remains on. In this way, the device continuously analyses the input connectors and adapts the programmable circuit when a change occurs. According to an improvement, the continuously operational analysis step involves analysis of information sent by another device during its connection. In this way, the device containing the programmable circuit reacts very rapidly to a change and adapts the programmable circuit as a consequence.

According to an improvement, at least one configuration file is selected according to a configuration of several operational connections. Hence, a single configuration file can suffice for the management of many connections.

According to an improvement, the principle functions of the device are disabled during the downloading step. In this way, the random signals emitted by the programmable component during its programming do not trigger undesirable behaviour in the device. According to an embodiment variant, during the downloading step, the device emits a message indicating a momentary disabling of the functions. In this way, the user is made aware of such a disabling operation.

Another object of the present invention is a processing device comprising of at least one central processing unit, a plurality of connectors designed to transmit communication signals with at least one other device, and a programmable circuit enabling processing of at least one part of the communication signals received by said connectors and of transmitting them to at least one other circuit of the device:

characterized in that it comprises a means of analysing said communication signals in order to detect the operational connections enabling communication with at least one other device, and a means of downloading at least one configuration file selected from among a set of configuration files according to the presence of the detected operational connections.

Figure 2:
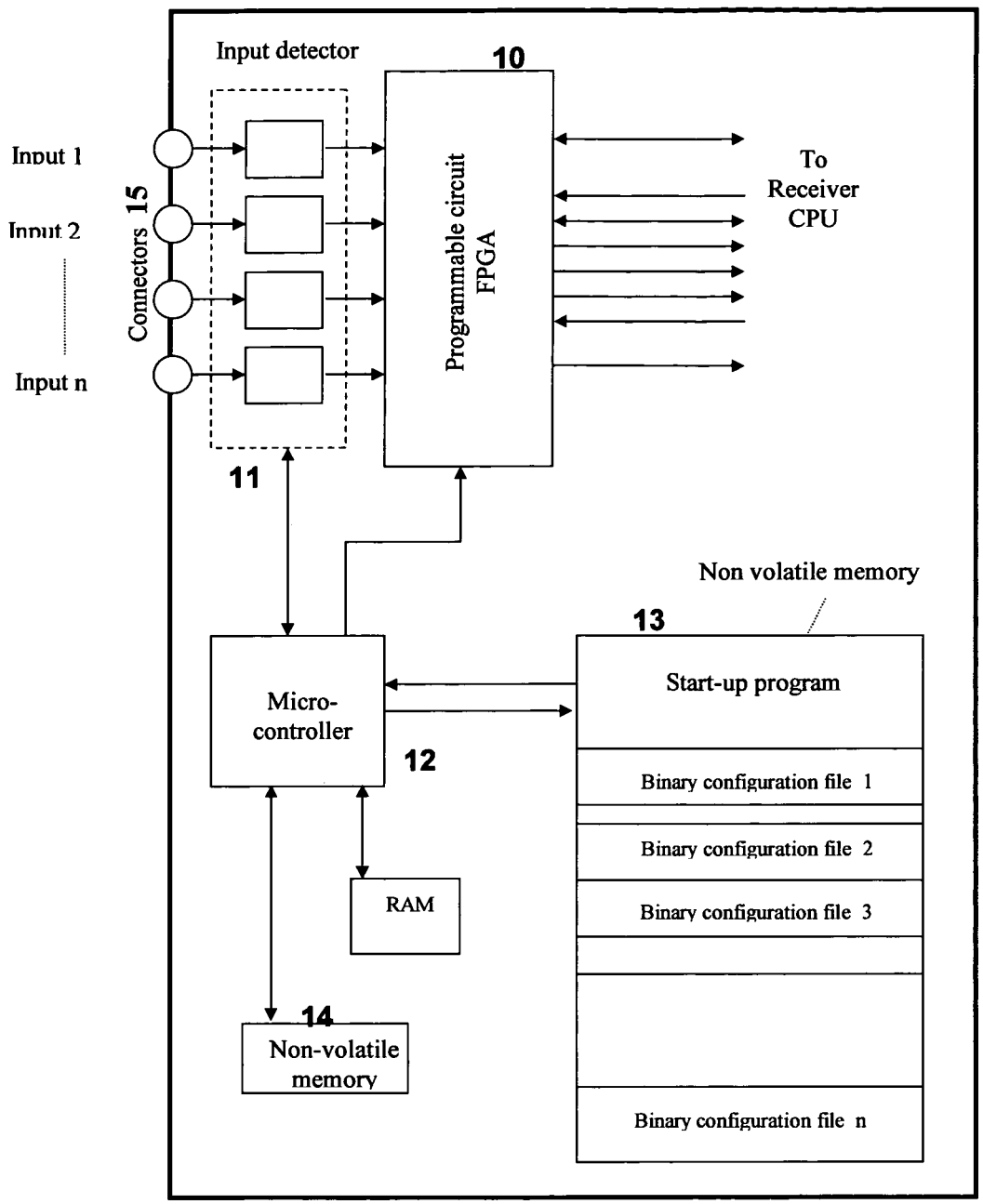

Other characteristics and advantages of the invention will emerge with the description of a non-restrictive embodiment of the invention, explained using the figures herein, among which:

FIG. 1 is a block diagram of a receiver, typically an audio player according to an embodiment of the invention, FIG. 2 is a block diagram of the interface enabling the connection of the receiver to several devices, FIG. 3 shows a flowchart presenting the main steps of a simplified embodiment of an embodiment of the present invention.

According to a preferred embodiment, the programmable circuit is implemented in a receiver such as represented in FIG. 1, typically a receiver 1 associated with a display device 2. The receiver comprises a central processing unit 3 linked to a program memory 6, an infrared signal receiver 7 to receive signals from a remote control, and an audio/video decoding logic 9 for the generation of audiovisual signals sent to the television screen 2. The receiver 1 also comprises a circuit 8 for the display of data on a screen, often referred to as an OSD (On Screen Display). The OSD circuit 8 is a text and graphics generator that enables on-screen display of menus, pictograms or other graphics. The receiver has a set of connectors 15 enabling notably the reception of audio and/or video data from a broadcast network via a receiver antenna associated with a demodulator 4, the network can be radio, cable or satellite. The connectors 15 also ensure communication with a high bit rate local digital bus enabling the reception of information on the broadcast audio content. This network is for example an IEEE 1394 network. The interface 5 enables connection with other devices, for example devices having USB, CVBS (composite video input) or 4:2:2 (CCIR 656—digital video) type connections, also via the connectors 15.

The interface circuits 5 comprising a programmable circuit 10 that ensures certain interfacing functions between the central processing unit 3 and the input/output connections.

FIG. 2 shows a block diagram presenting interface circuits 5 enabling communication between the receiver 1 and other local or remote devices. This diagram particularly shows the programmable circuit 10 and the hardware means enabling the programming to be provided. The programmable circuit 10 receives input signals from a circuit 11. The circuit 11 enables in addition to the electrical adaptation, the detection of variations in the signals applied the device's inputs. The circuit 11 notably detects the connection of new devices delivering a useful signal. The connected devices can also communicate by non-physical link such as radio (using a WIFI connection for example), microwave, infrared, or any other means of wireless communication. In this case, the circuit 11 contains wireless means of communication ensuring a link between the device 1 and the connected devices.

The circuit 11 is linked to a control circuit 12, typically a microcontroller, in this way the latter receives information on the use of input output connections. The control circuit 12 is linked to a non-volatile memory 13, that is normally a Flash memory, of a typical capacity of 16 Megabytes and a working memory RAM physically represented in the diagram as exterior to the control circuit 12 but being perfectly capable of being integrated into it. The circuit 12 is also linked to a non-volatile memory 14, typically an EEPROM component communicating with a bus 12C or a serial link. The memory 14 contains the correspondence table between the different supported connection configurations at input and the binary configuration files loaded in the programmable circuits. The fact of having an independent component enables industrial or after sales simplification of the reprogramming of this non-volatile memory. Its size can be limited to a few bytes or tens of bytes.

The memory 13 contains a principle program destined to control the product's set of functions, and a set of binary configuration files (Firmware 1, Firmware 2, Firmware 3, etc.). The format of these files is described by the manuals of programmable circuit manufacturers.

The configuration of each of these programmable circuits allows access to functions using all of or a part of the signals transmitted by the connectors 15.

After having detailed the principle components of an embodiment of the invention, it will now be shown using the flow chart from FIG. 3 how they cooperate.

Initially, the user installs the different devices and connects them. The analysis of the connections is made at powering up (step 3.1). This step enables the new connections made while the receiver 1 was powered off to be detected. At step 3.2 the detection circuit 11 analyses the state of the input connectors 15 in order to determine which the operational connections are. Operational connection is understood to mean the detected presence of a useful signal in valid format. Following this analysis, the microcontroller 12 selects the binary configuration file corresponding to devices connected to the receiver (step 3.3). According to an improvement, the binary configuration file is referenced by a data word containing a plurality of binary indicators, each associated with an input. The size of the word in bits is equal to the number of inputs available on the device. The microcontroller 12 successively reads each data word associated with a file. If, for a given word, the input binary indicator connected to an operational device is at "1", then the microcontroller selects the configuration file associated with this word.

In step 3.4, the microcontroller determines whether the binary configuration file(s) are already loaded in the programmable component 10. This step is optional, a configuration can also be systematically loaded during every change. If at least one file is not loaded then the program goes to step 3.5. Otherwise, it is unnecessary to modify the present configuration within the circuit 10 and the program goes directly to the step 3.8 of awaiting the connection change. In step 3.5, the microcontroller inhibits the functioning of the receiver so as to avoid any random signals emitted by the component 10 during its programming. Another solution involves the microcontroller 12 that informs the central processing unit 3 of the receiver of the loading of a new binary configuration file. The central processing unit then informs the user of the unavailability of the device, displaying a message at the bottom of a screen of uniform color. At step 3.6, the configuration file(s) selected at step 3.2 are downloaded from the memory 13 in the component 10. The download is performed in accordance with the specifications of the programmable circuit manufacturer and does not require further explanations. If the configuration of valid signals detected at input has no impact with respect to the product definition, the configuration of the programmable circuit 10 remains unchanged until a valid configuration is detected or until the inputs are reconnected in the last established configuration.

Once this operation has been completed, the microcontroller 12 authorizes the correct operation of the receiver (step 3.7). The received signals are then taken into account by the programmable circuit having a suitable configuration file. At step 3.8, the microcontroller 12 continues the execution of a connection change detection delay loop. To avoid unnecessary consumption of current, the circuit 11 detects changes in the connections and activates the microcontroller 12 using a switch, this microcontroller being normally deactivated.

Hence, a device can have a large number of processing functions available on a product that has a common hardware and software base and a finite number of programmable circuits. The advantage is a notable reduction in development costs and global hardware costs for a 'family of products', and a product that can rapidly adapt to a new configuration according to its connection mode.

There are many ways of detecting the appearance and disappearance of connections. Here is a first way: in response to a request or in the form of interruptions, the detection circuit 11 transmits the information to the control circuit 12 to inform it of the existence and the nature of the electrical connections with exterior working devices. The presence of a working device is detected for example by the voltage on a pin of at least one connecter 15. Depending on this information, the control circuit selects one or several binary configuration files, in step 3.3. Typically, we find in the memory 13 as many interface data sets as there are connecters 15 on the devices. The selected set is then loaded on the programmable component 10.

Another way to detect a connection involves having a mechanical contact on a connector 15, this contact is in a closed position when the connection pin is introduced into the receiver connector 1. An electrical signal bearing a binary information: "0" if the pin is present, "1" if the pin is absent, is transmitted to the control circuit 12. The microcontroller 12 analyses the state of the signals associated with each connector 15 and deduces the connections present, then it uses the signals to address the memory to search for the binary configurations file to process the signals received on the input connectors 15.

According to an improvement, the table contains priority indicators enabling a hierarchy to be defined when several devices are connected. This hierarchy consists in attributing a priority value to each input, the input with the highest priority having a value of 1.

According to a variant, when several connections are detected, the microcontroller loads as many binary configuration files as there are operational connections.

The receiver 1 can have several programmable circuits 10 whose programming depends upon the signals present on the input connectors 15. In this case, the microcontroller 12 controls the loading of binary configuration files for the set of programmable circuits.

According to an improvement, the connected device sends an information block containing an identifier of the device. This block is used by the "Plug and Play" function to automatically configure the devices during connection. The connected devices exchange their information, which can configure the communication and display on the device having a display means, an identifier of the connected device. A well-known example consists in connecting a USB key to a computer, the computer screen displays the characteristics of the connection. According to another example, the user connects to a connector 15 a cable transmitting an SDI (Serial Digital Interface) video stream, the detection circuit 11 detects the information received, deduces the nature of the signal and transmits it to the microcontroller 12. The receiver 1 according to the present invention receives the information transmitted during connection and uses the device or its type identifier to select the binary configuration file.

The present embodiment must be considered as being an example but can be modified in the domain defined by the scope of the attached claims. In particular, the invention is not limited to the binary configuration files previously described but to all programming means intended to configure programmable circuits.

The invention claimed is:

1. A method for configuring a programmable circuit implemented in a device, the method comprising:
   detecting communication signals present on connectors of the device at powering up of the device, in order to detect at least two operational connections enabling communication with at least one other device,
   automatically selecting at least one two configuration files among a set of configuration files according to the presence of the at least two detected operational connections; and
   downloading the at least two selected configuration files to the programmable circuit.

2. The method according to claim 1, wherein the detected operational connections are those for which a connected device delivers a determined electrical level.

3. The method according to claim 1, wherein the programmable circuit causes the device to send a message to a user indicating a momentary disabling of functions of the device during the downloading.

4. A programmable circuit implemented in a device, the device having at least one central processing unit, a plurality of connectors intended to transmit communication signals with at least one other device, the programmable circuit comprising:
   a detection circuit configured to detect communication signals present on connectors of th device at powering up of the device, and in order to detect at least two operational connections enabling communication with at least one other device, and
   a microcontroller configured to automatically select at least two configuration files selected from among a set of configuration files according to the presence of the at least two detected operational connections;
   wherein the mircrocontroller is further configured to download at least one selected configuration file to the programmable circuit.

5. The programmable circuit according to claim 4, wherein the detection circuit determines the operational connections such as those connections supplying a determined electrical level.

6. The programmable circuit according to claim 4, wherein the detection circuit analyzes all the communication signals from the connectors in order to select the at least two configuration files.

7. The programmable circuit according to claim 4, wherein the micro controller informs the central processing unit of the device to transmit a message to the user indicating a temporary deactivation of functions during the downloading.

8. The method according to claim 1, wherein said detecting further comprises analyzing all the communication signals from the device's connectors in order to select the at least two configuration files.

9. A programmable circuit implemented in a device, the device having at least one central processing unit and a plurality of connectors intended to transmit communication signals with at least one other device, the programmable circuit comprising:
   a detection circuit configured to detect communication signals present on connectors of the device at powering up of the device, and in order to detect at least two operational connections enabling communication with at least one other device, and
   a microcontroller configured to automatically select at least two configuration files selected from among a set of configuration files according to the presence of the at least two detected operational connections, 10. The programmable circuit according to claim 9, wherein the detection circuit determines the operational connections such as those connections supplying a determined electrical level.

11. The-programmable circuit according to claim 9, wherein the detection circuit analyzes all the communication signals from the connectors in order to select the at least two configuration files.

12. The programmable circuit according to claim 10, wherein the microcontroller is further configured to download at least one selected configuration file to the programmable circuit.

13. The programmable circuit according to claim 11, wherein the microcontroller is further configured to download at least one selected configuration file to the programmable circuit.

14. The programmable circuit according to claim 12, wherein the micro controller informs the central processing unit of the device to transmit a message to the user indicating a temporary deactivation of device functions during the downloading.

15. The programmable circuit according to claim 13, wherein the micro controller informs the central processing unit of the device to transmit a message to the user indicating a temporary deactivation of device functions during the downloading.

* * * * *

UNITED STATES PATENT AND TRADEMARK OFFICE
CERTIFICATE OF CORRECTION

| | | |
|---|---|---|
| PATENT NO. | : 9,037,673 B2 | Page 1 of 1 |
| APPLICATION NO. | : 12/086820 | |
| DATED | : May 19, 2015 | |
| INVENTOR(S) | : Olivier Horr | |

It is certified that error appears in the above-identified patent and that said Letters Patent is hereby corrected as shown below:

In The Claims

Claim 1, line 8 should read:

automatically selecting at least two configuration files

Signed and Sealed this
Twenty-third Day of February, 2016

Michelle K. Lee
*Director of the United States Patent and Trademark Office*